C. E. WAKEMAN.

Assignor of one-half to P. A. HITCHCOCK.

STOCKING.

No. 10,150. Reissued July 4, 1882.

Attest
F. L. Middleton
Walter D. Maldson

Inventor
Charles E. Wakeman
by
Geo. Spear
Atty.

UNITED STATES PATENT OFFICE.

CHARLES E. WAKEMAN, OF PONTIAC, MICHIGAN, ASSIGNOR OF ONE-HALF TO P. A. HITCHCOCK, OF SAME PLACE.

STOCKING.

SPECIFICATION forming part of Reissued Letters Patent No. 10,150, dated July 4, 1882.

Original No. 174,339, dated February 29, 1876; Reissue No. 8,353, dated July 30, 1878; Reissue No. 9,550, dated February 1, 1881.
Application for reissue filed June 5, 1882.

*To all whom it may concern:*

Be it known that I, CHARLES E. WAKEMAN, of Pontiac, in the county of Oakland and State of Michigan, have invented a certain Improvement in Stockings; and I do hereby declare that the following is a full, clear, and exact description thereof, reference being had to the accompanying drawings, and to the letters of reference marked thereon, which form a part of this specification.

My invention consists in the sock constructed as hereinafter described and claimed as a new and improved article of manufacture.

In order to enable others skilled in the art to which the invention appertains to make and use the same, I wi" now proceed to describe its construction, referring to the annexed drawings, in which—

Figure 1:
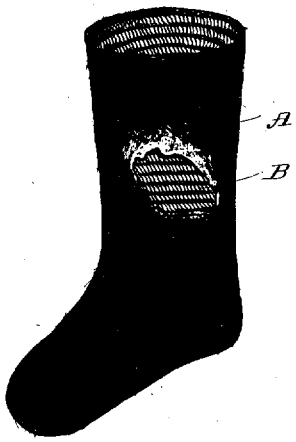
Figure 2:
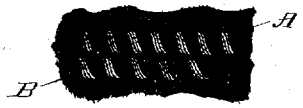

Figure 1 is a side view of a sock embodying my invention, and Fig. 2 shows the mode of making the interior lining, similar letters of reference denoting the same parts of the manufactured article.

A represents a woolen sock made on an ordinary knitting-machine in the usual manner, with the leg seamless above the heel, and with the foot seamless forward of the heel. The sock is then placed in an ordinary fulling-machine, whereby it is fulled and thickened and a nap put on the outside and inside thereof. It is then lined throughout by means of a series of circumferential rows of woolen loops, B, sewed in by hand or otherwise, as shown, forming a soft, yielding, and pliable lining.

The sock may be used without shoes, if preferred, by attaching a sole of buckskin or other suitable material to the under side of the foot.

I claim as my invention—

As a new and improved article of manufacture, a fulled knit stocking provided with a lining of woolen loops and with a seamless leg and a seamless foot, substantially as described.

CHARLES E. WAKEMAN.

Witnesses:
B. S. TREGENT,
JNO. D. NORTON